US012352440B2

(12) United States Patent
Stieg et al.

(10) Patent No.: US 12,352,440 B2
(45) Date of Patent: Jul. 8, 2025

(54) COMBUSTOR ASSEMBLY FOR A TURBINE ENGINE

(71) Applicant: General Electric Company, Schenectady, NY (US)

(72) Inventors: Michael Alan Stieg, Cincinnati, OH (US); Gregory Scott Phelps, Cincinnati, OH (US); Jeffrey Douglas Johnson, Newark, DE (US); Chad Holden Sutton, Nashville, TN (US); Robert Andrew Stowers, Buffalo, NY (US); Darrell Glenn Senile, Oxford, OH (US)

(73) Assignee: GENERAL ELECTRIC COMPANY, Evendale, OH (US)

(*) Notice: Subject to any disclaimer, the term of this patent is extended or adjusted under 35 U.S.C. 154(b) by 0 days.

(21) Appl. No.: 18/309,262

(22) Filed: Apr. 28, 2023

(65) Prior Publication Data

US 2023/0417412 A1    Dec. 28, 2023

Related U.S. Application Data

(60) Continuation of application No. 16/654,571, filed on Oct. 16, 2019, now Pat. No. 11,725,814, which is a
(Continued)

(51) Int. Cl.
*F23R 3/00* (2006.01)
*F23R 3/60* (2006.01)

(52) U.S. Cl.
CPC .............. *F23R 3/002* (2013.01); *F23R 3/007* (2013.01); *F23R 3/60* (2013.01);
(Continued)

(58) Field of Classification Search
None
See application file for complete search history.

(56) References Cited

U.S. PATENT DOCUMENTS 3,981,142 A    9/1976  Irwin
5,275,529 A *  1/1994  Langenbrunner ....... F02C 7/045
                                                  403/388
(Continued)

FOREIGN PATENT DOCUMENTS

CN         105073317 A      11/2015

OTHER PUBLICATIONS

AZoM, Composite Matric Materials, Aug. 9, 2013 (Year: 2013).
Wikipedia, Ceramic Matrix Composite, Feb. 26, 2013 (Year: 2013).
Zhang, Advances in Ceramic Matrix Composites, 2014 (Year: 2014).

*Primary Examiner* — Edwin Kang
(74) *Attorney, Agent, or Firm* — Venable LLP; Michael C. Sanko; Michele V. Frank

(57) ABSTRACT

A combustor assembly for a gas turbine engine includes a dome having a forward surface and an inner surface. The forward surface and the inner surface of the dome at least partially define a slot. The combustor assembly also includes a liner at least partially defining a combustion chamber and extending between an aft end and a forward end. The forward end of the liner is positioned within the slot of the dome. The forward end of the liner includes an axial interface surface and a radial interface surface. The axial interface surface defines a radial gap with the inner surface of the dome and the radial interface surface defines an axial gap with the forward surface of the dome. At least one of the radial gap or the axial gap is less than about 0.150 inches during operating conditions of the combustor assembly to prevent an undesirable airflow.

19 Claims, 7 Drawing Sheets

Related U.S. Application Data division of application No. 15/239,888, filed on Aug. 18, 2016, now abandoned.

(52) U.S. Cl.
CPC ............... *F23R 2900/00005* (2013.01); *F23R 2900/00017* (2013.01); *F23R 2900/00018* (2013.01)

(56) References Cited

U.S. PATENT DOCUMENTS

| | | | |
|---|---|---|---|
| 5,755,093 A | 5/1998 | Palusis et al. | |
| 6,265,078 B1 | 7/2001 | Atmur et al. | |
| 6,284,089 B1 | 9/2001 | Anderson et al. | |
| 6,382,905 B1 * | 5/2002 | Czachor | F04D 29/526 |
| | | | 415/128 |
| 6,397,603 B1 | 6/2002 | Edmondson et al. | |
| 6,436,507 B1 | 8/2002 | Pannell | |
| 6,655,148 B2 | 12/2003 | Calvez et al. | |
| 6,775,985 B2 | 8/2004 | Mitchell et al. | |
| 7,141,191 B2 | 11/2006 | Engwall et al. | |
| 7,229,513 B2 | 6/2007 | Keith et al. | |
| 7,686,990 B2 | 3/2010 | Gray | |
| 7,849,696 B2 | 12/2010 | De Sousa et al. | |
| 9,034,128 B2 | 5/2015 | Lea et al. | |
| 9,102,571 B2 | 8/2015 | Szweda et al. | |
| 9,850,175 B2 | 12/2017 | Araki et al. | |
| 10,197,278 B2 | 2/2019 | Bloom et al. | |
| 11,725,814 B2 * | 8/2023 | Stieg | F23R 3/002 |
| | | | 60/753 |
| 2002/0184886 A1 * | 12/2002 | Calvez | F23R 3/60 |
| | | | 60/804 |
| 2004/0118122 A1 * | 6/2004 | Mitchell | F23R 3/60 |
| | | | 60/752 |
| 2004/0118127 A1 * | 6/2004 | Mitchell | F23R 3/60 |
| | | | 60/752 |
| 2006/0280955 A1 | 12/2006 | Spitsberg et al. | |
| 2008/0230997 A1 * | 9/2008 | Boston | F23R 3/002 |
| | | | 277/355 |
| 2010/0263386 A1 | 10/2010 | Edwards et al. | |
| 2011/0011095 A1 | 1/2011 | Ladd et al. | |
| 2011/0126543 A1 | 6/2011 | Kirsopp et al. | |
| 2011/0219775 A1 | 9/2011 | Jarmon et al. | |
| 2011/0281114 A1 | 11/2011 | Butler | |
| 2012/0036857 A1 * | 2/2012 | Bassani | F23R 3/60 |
| | | | 29/700 |
| 2012/0180492 A1 * | 7/2012 | Simo | B22D 25/00 |
| | | | 60/752 |
| 2013/0243601 A1 * | 9/2013 | Floyd | F01D 5/3053 |
| | | | 416/220 R |
| 2014/0321941 A1 * | 10/2014 | Hufenbach | B60G 7/008 |
| | | | 411/337 |
| 2016/0159695 A1 | 6/2016 | Chamberlain et al. | |
| 2016/0356499 A1 * | 12/2016 | Freeman | F01D 25/246 |

\* cited by examiner

COMBUSTOR ASSEMBLY FOR A TURBINE ENGINE

CROSS-REFERENCE TO RELATED APPLICATIONS

This application is a continuation of U.S. patent application Ser. No. 16/654,571 filed on Oct. 16, 2019, which is a divisional of U.S. patent application Ser. No. 15/239,888 filed on Aug. 18, 2016, the entire contents of each of which are hereby incorporated by reference in their entireties.

FIELD OF THE INVENTION

The present subject matter relates generally to a gas turbine engine, or more particularly to a combustor assembly for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

More commonly, non-traditional high temperature materials, such as ceramic matrix composite (CMC) materials, are being used as structural components within gas turbine engines. For example, given an ability for CMC materials to withstand relatively extreme temperatures, there is particular interest in replacing components within the combustion section of the gas turbine engine with CMC materials. More particularly, an inner liner and an outer liner of gas turbine engines are more commonly being formed of CMC materials.

By contrast, a dome within the combustion section may be formed of a metal material, with the inner and outer liners attached thereto. It can be difficult, however, to provide cooling air to the inner and outer liners proximate the attachment locations of the inner and outer liners to the dome. Accordingly, a gas turbine engine, or more particularly, a combustor assembly of a gas turbine engine, capable of more effectively providing a desired flow of cooling air to the inner and outer liners proximate the attachment locations of the inner and outer liners to the dome would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a combustor assembly is provided for a gas turbine engine defining an axial direction and a radial direction. The combustor assembly includes a dome having a forward surface and an inner surface. The forward surface and the inner surface at least partially define a slot. The combustor assembly also includes a liner at least partially defining a combustion chamber and extending between an aft end and a forward end. The forward end of the liner is received within the slot of the dome. The forward end of the liner includes an axial interface surface and a radial interface surface. The axial interface surface defines a radial gap with the inner surface of the dome and the radial interface surface defines an axial gap with the forward surface of the dome. At least one of the radial gap or axial gap is less than about 0.150 inches during operating conditions of the combustor assembly.

In an exemplary aspect of the present disclosure, a method is provided for manufacturing a combustor assembly of a gas turbine engine. The combustor assembly includes a liner and a dome. The dome includes a forward surface and an inner surface. The method includes forming a liner of a ceramic matrix composite material to include a baseline geometry, and removing material from the liner to change the baseline geometry to include an interface surface. The method also includes mounting the liner to the dome.

In another exemplary aspect of the present disclosure, a method for cooling a combustor assembly of a gas turbine engine is provided. The combustor assembly includes a liner and a dome, the dome including a forward surface and an inner surface at least partially defining a slot. The liner includes a forward end received within the slot. The method includes providing a cooling airflow to the slot defined by the forward surface and the inner surface of the dome. The method also includes providing the cooling airflow through an axial gap defined between the forward end of the liner and the forward surface of the dome, the axial gap being less than about 0.150 inches. The method also includes providing the cooling airflow through a radial gap defined between the forward end of the liner and the inner surface of the dome, the radial gap being less than about 0.020 inches. The method also includes providing the cooling airflow to a combustion chamber defined at least in part by the liner and the dome.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
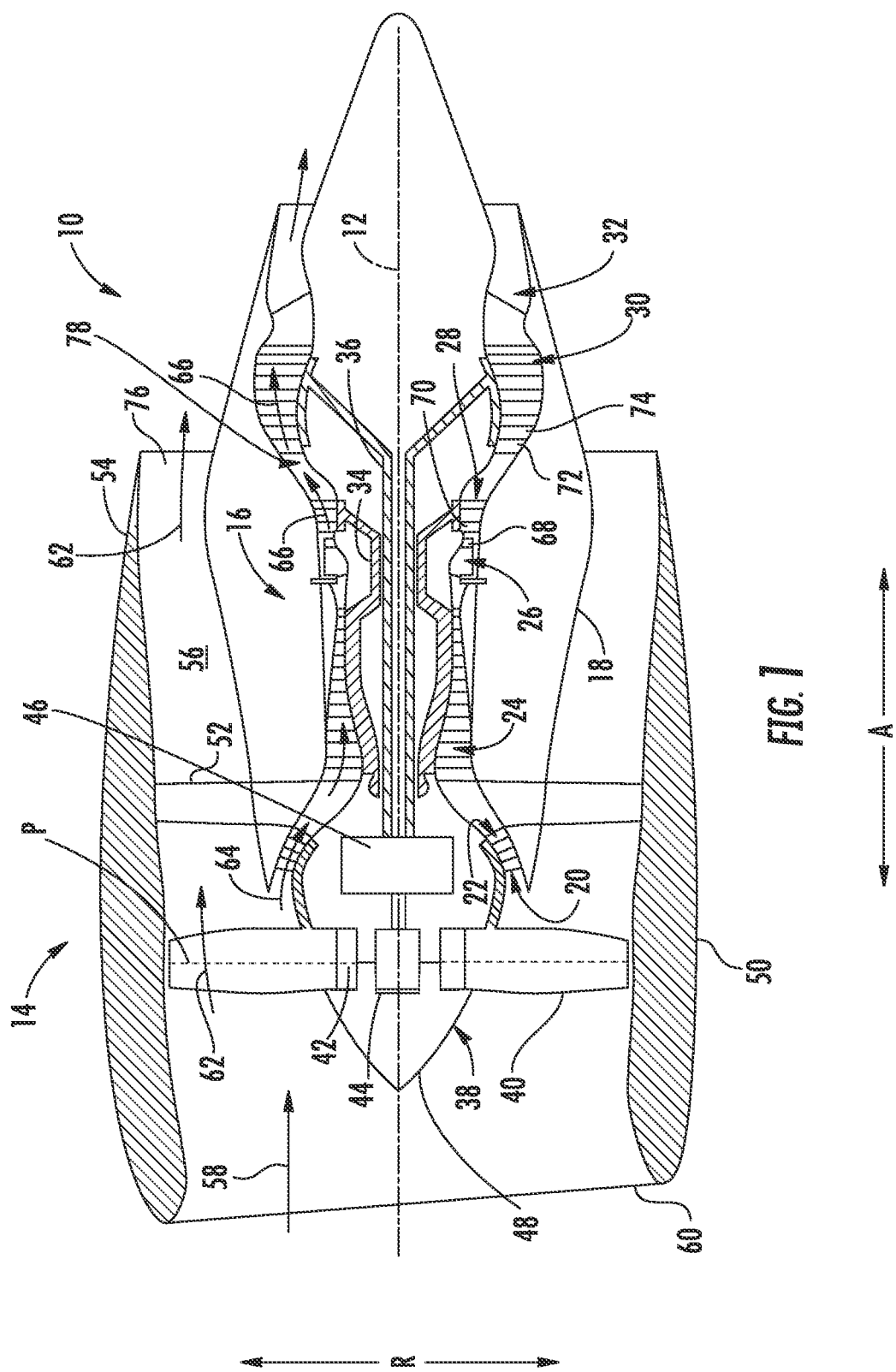
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration.

Figure 2:
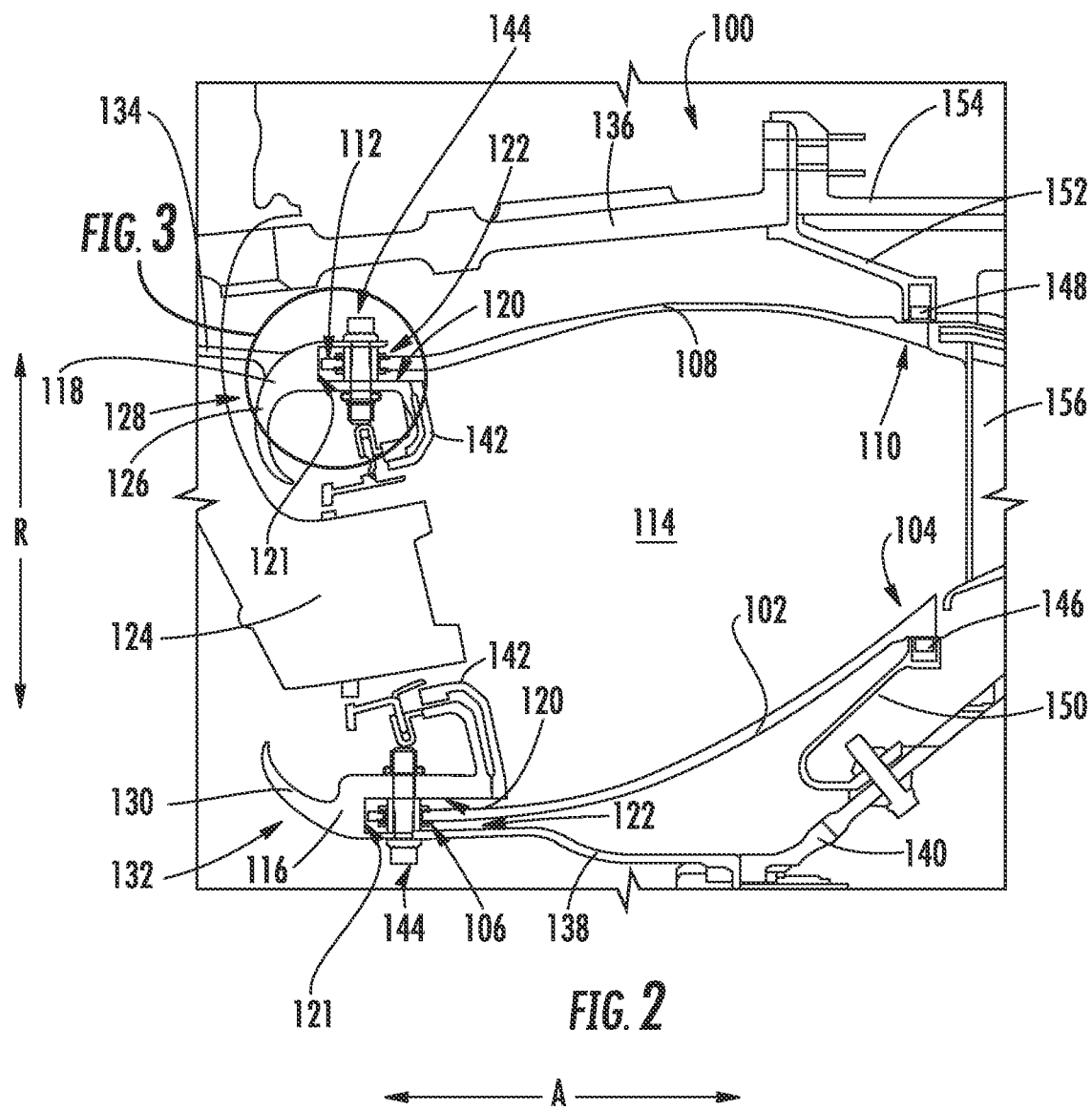
FIG. 2 is a schematic, cross-sectional view of a combustor assembly in accordance with an exemplary embodiment of the present disclosure.

Referring now to FIG. 2, a close-up cross-sectional view is provided of a combustor assembly 100 in accordance with an exemplary embodiment of the present disclosure. For example, the combustor assembly 100 of FIG. 2 may be positioned in the combustion section 26 of the exemplary turbofan engine 10 of FIG. 1. More particularly, FIG. 2 provides a side, cross-sectional view of the exemplary combustor assembly 100 of FIG. 2.

As shown, the combustor assembly 100 generally includes an inner liner 102 extending between an aft end 104 and a forward end 106 generally along the axial direction A, as well as an outer liner 108 also extending between an aft end 110 and a forward end 112 generally along the axial direction A. The inner and outer liners 102, 108 together at least partially define a combustion chamber 114 therebetween. The inner and outer liners 102, 108 are each attached to an annular dome. More particularly, the annular dome includes an inner dome section 116 attached to the forward end 106 of the inner liner 102 and an outer dome section 118 attached to the forward end 112 of the outer liner 108. The inner and outer dome section 116, 118 may be formed integrally (or alternatively may be formed of a plurality of components attached in any suitable manner) and may each extend along the circumferential direction C to define an annular shape. As will be discussed in greater detail below with reference to FIG. 3, the inner and outer dome sections 116, 118 each also include a forward surface 120 and an inner surface 121 (i.e., inner relative to the combustion chamber 114) at least partially defining a slot 122 for receipt of the forward end 106 of the inner liner 102, and the forward end 112 of the outer liner 108, respectively.

The combustor assembly 100 further includes a plurality of fuel air mixers 124 spaced along a circumferential direction C and positioned at least partially within the annular dome. More particularly, the plurality of fuel air mixers 124 are disposed at least partially between the outer dome section 118 and the inner dome section 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer dome sections 116, 118 are configured to assist in providing such a flow of compressed air from the compressor section into or through the fuel air mixers 124. For example, the outer dome section 118 includes an outer cowl 126 at a forward end 128 and the inner dome section 116 similarly includes an inner cowl 130 at a forward end 132. The outer cowl 126 and inner cowl 130 may assist in directing the flow of compressed air from the compressor section 26 into or through one or more of the fuel air mixers 124.

Moreover, the inner and outer dome sections 116, 118 each include attachment portions configured to assist in mounting the combustor assembly 100 within the turbofan engine 10. For example, the outer dome section 118 includes an attachment extension 134 configured to be mounted to an outer combustor casing 136 and the inner dome section 116 includes a similar attachment extension 138 configured to attach to an annular support member 140 within the turbofan engine 10. In certain exemplary embodiments, the inner dome section 116 may be formed integrally as a single annular component, and similarly, the outer dome section 118 may also be formed integrally as a single annular component. It should be appreciated, however, that in other exemplary embodiments, the inner dome section 116 and/or the outer dome section 118 may alternatively be formed by one or more components being joined in any suitable manner. For example, with reference to the outer dome section 118, in certain exemplary embodiments, the outer cowl 126 may be formed separately from the outer dome section 118 and attached to the forward end 128 of the outer dome section 118 using, e.g., a welding process. Similarly, the attachment extension 134 may also be formed separately from the outer dome section 118 and attached to the forward end 128 of the outer dome section 118 using, e.g., a welding process. Additionally, or alternatively, the inner dome section 116 may have a similar configuration.

Referring still to FIG. 2, the exemplary combustor assembly 100 further includes a heat shield 142 positioned around the fuel air mixer 124 depicted. The exemplary heat shield 142, for the embodiment depicted, is attached to and extends between the outer dome section 118 and the inner dome section 116. The heat shield 142 is configured to protect certain components of the turbofan engine 10 from the relatively extreme temperatures of the combustion chamber 114.

For the embodiment depicted, the inner liner 102 and the outer liner 108 are each formed of a ceramic matrix composite (CMC) material, which is a non-metallic material having high temperature capability. Exemplary CMC materials utilized for such liners 102, 108 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials may have coefficients of thermal expansion in the range of about $1.3 \times 10^{-6}$ in/in/° F. to about $3.5 \times 10^{-6}$ in/in/° F. in a temperature of approximately 1000-1200° F.

By contrast, the annular dome, including the inner dome section 116 and outer dome section 118, may be formed of a metal, such as a nickel-based superalloy (having a coefficient of thermal expansion of about $8.3-8.5 \times 10^{-6}$ in/in/° F. in a temperature of approximately 1000-1200° F.) or cobalt-based superalloy (having a coefficient of thermal expansion of about $7.8-8.1 \times 10^{-6}$ in/in/° F. in a temperature of approximately 1000-1200° F.).

Referring still to FIG. 2, at the aft end 104 of the inner liner 102 and at the aft end 110 of the outer liner 108, the combustor assembly 100 includes an inner piston ring seal 146 and an outer piston ring seal 148, respectively. The inner piston ring seal 146 is attached to an inner piston ring holder 150 extending from and attached to an interior casing (which for the embodiment depicted is the annular support member 140). Similarly, the outer piston ring seal 148 is attached to an outer piston ring holder 152 extending from and attached to an outer casing (which for the embodiment depicted includes the outer combustor casing 136 and an outer turbine casing 154). The inner piston ring holder 150 and the outer piston ring holder 152 are configured to accommodate an expansion of the inner liner 102 and the outer liner 108 generally along the axial direction A, as well as generally along the radial direction R.

Referring still to FIG. 2, and as is discussed above, the combustion gases 66 flow from the combustion chamber 114 into and through the turbine section of the turbofan engine 10 where a portion of thermal and/or kinetic energy from the combustion gases 66 is extracted via sequential stages of turbine stator vanes and turbine rotor blades. A stage one (1) turbine blade 156 is depicted schematically in FIG. 2, aft of the combustor assembly 100.

Figure 3:
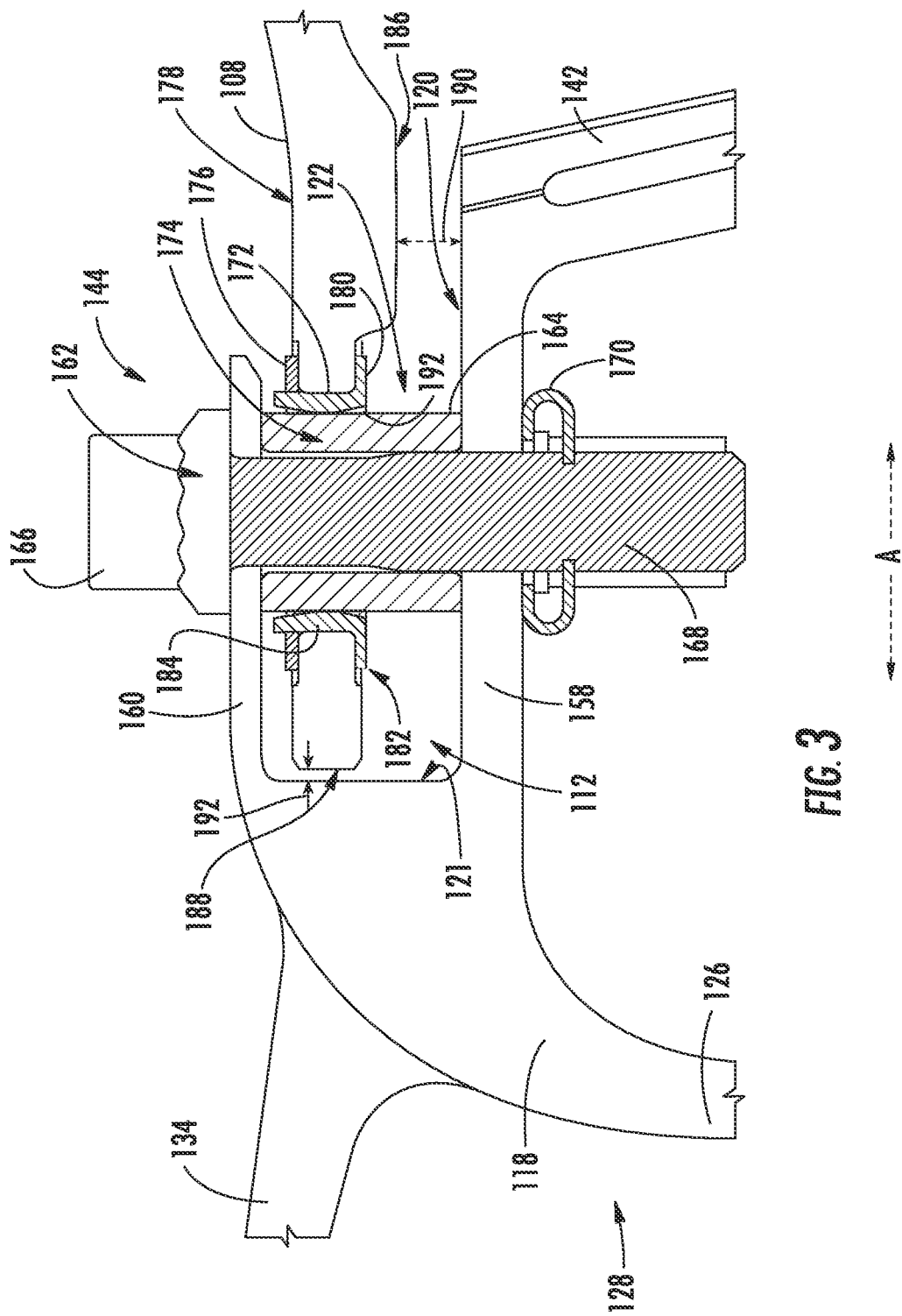
FIG. 3 is a close up, cross-sectional view of an attachment point of the exemplary combustor assembly of FIG. 2, where a forward end of an outer liner in accordance with an exemplary embodiment of the present disclosure is attached to an outer dome section.

Referring now to FIG. 3, a close up, schematic, cross-sectional view is depicted of an attachment point where the forward end 112 of the outer liner 108 is mounted to the outer dome section 118 within the slot 122 of the outer dome section 118. The view of FIG. 3 (and also of FIG. 2) is during operating conditions of the combustor assembly. More specifically, FIG. 3 depicts the combustor assembly during conditions where fuel is being burned within the combustion chamber 114 to generate combustion gasses and all components of the combustor assembly 100 have reached a steady temperature.

To allow for a relative thermal expansion between the outer liner 108 and the outer dome section 118, as well as between the inner liner 102 and the inner dome section 116, a plurality of mounting assemblies 144 are used to attach the outer liner 108 to the outer dome section 118 and the inner liner 102 to the inner dome section 116. More particularly, the mounting assemblies 144 attach the forward end 112 of the outer liner 108 to the outer dome section 118 within the slot 122 of the outer dome section 118 and the forward end 106 of the inner liner 102 to the inner dome section 116 within the slot 122 of the inner dome section 116 (see FIG. 2). As stated, the slots 122 are at least partially defined by the forward surfaces 120 and inner surfaces 121 of the respective inner and outer dome sections 116, 118, and further, the slots 122 receive the forward ends 106, 112 of the inner and outer liners 102, 108, respectively.

Referring particularly to the forward end 112 of the outer liner 108 and the outer dome section 118 depicted in FIG. 3, the outer dome section 118 includes a base plate 158 and a yoke 160. The base plate 158 and the yoke 160 each extend substantially parallel to one another, which for the embodiment depicted is a direction substantially parallel to the axial direction A of the turbofan engine 10 (see also FIG. 2). Notably, the slot 122 is defined between the base plate 158 and the yoke 160. Further, in certain exemplary embodiments, the yoke 160 may extend circumferentially with the outer dome section 118, tracking the base plate 158. With such a configuration, the slot 122 may be considered an annular slot. However, in other embodiments, the yoke 160 may include a plurality of circumferentially spaced tabs, each of the individual tabs of the yoke 160 defining individual segmented portions of the slot 122 with the base plate 158.

The exemplary mounting assembly 144 depicted extends through the yoke 160 of the outer dome section 118, the forward end 112 of the outer liner 108 (positioned in the slot 122), and the base plate 158 of the outer dome section 118. More particularly, for the embodiment depicted, the mounting assembly 144 includes a pin 162 and a bushing 164. The pin 162 includes a head 166 and a shank 168, the shank 168 extending through the yoke 160, the forward end 112 of the outer liner 108 (positioned in the slot 122), and the base plate 158. A nut 170 is attached to a distal end of the shank 168 of the pin 162. In certain exemplary embodiments, the pin 162 may be configured as a bolt and the nut 170 may be rotatably engaged with a threaded portion of the pin 162 (at, e.g., the distal end of the shank 168) for tightening the mounting assembly 144. Alternatively, however, in other exemplary embodiments the pin 162 and nut 170 may have any other suitable configuration. For example, in other exemplary embodiments, the pin 162 may include a shank 168 defining a substantially smooth cylindrical shape and the nut 170 may be configured as a clip.

Additionally, the bushing 164 is generally cylindrical in shape and positioned around the shank 168 of the pin 162 within the slot 122. For the embodiment depicted, the bushing 164 is pressed between the yoke 160 and the base plate 158 by tightening the nut 170 on the pin 162. Moreover, for the embodiment depicted, the mounting assembly 144 includes a metal grommet 172 positioned around the bushing 164 and pin 162. The grommet 172 is positioned in an opening 174 in the forward end 112 of the outer liner 108. The grommet 172 includes an outer collar 176 positioned adjacent to an outside surface 178 of the outer liner 108 and an inner collar 180 positioned adjacent to an inside surface 182 of the outer liner 108. The grommet 172 additionally includes a body 184. The metal grommet 172 may reduce an amount of wear on the forward end 112 of the outer liner 108 as the outer liner 108 moves inwardly and outwardly generally along the radial direction R relative to the outer dome section 118.

It should be appreciated, however, that although the forward end 112 of the outer liner 108 is attached to the outer dome section 118 using the exemplary attachment assembly 144 depicted and described herein, in other embodiments of the present disclosure, the attachment assembly 144 may have any other suitable configuration, and further still in other embodiments, any other suitable attachment assembly may be used.

Referring still to FIG. 3, the forward end 112 of the outer liner 108 depicted further includes an axial interface surface 186 and a radial interface surface 188. The axial interface surface 186 is configured as a portion of the forward end 112 of the outer liner 108 facing the base plate 158 of the outer dome section 118, or more particularly, facing the inner surface 120 of the outer dome section 118. The radial interface surface 188 is configured as a portion of the forward end 112 of the inner liner facing the forward surface 121 of the outer dome section 118. For the embodiment depicted, the axial interface surface 186 and inner surface 120 each extend in a direction parallel to the axial direction A, and the radial interface surface 188 and forward surface 121 each extend in a direction parallel to the radial direction R.

Moreover, for the embodiment depicted, the axial interface surface 186 defines a radial gap 190 with the inner surface 120 of the outer dome section 118 and the radial interface surface 188 defines an axial gap 192 with the forward surface 121 of the outer dome section 118. For the embodiment depicted, at least one of the radial gap 190 or axial gap 192 is less than about 0.150 inches during operating conditions of the combustor assembly 100. More particularly, for the embodiment depicted, at least one of the radial gap 190 or axial gap 192 is less than about 0.020 inches during operating conditions of the combustor assembly 100.

For example, referring still to the embodiment of FIG. 3, the radial gap 190 is less than about 0.020 inches during operating conditions of the combustor assembly 100 and the axial gap 192 is less than about 0.150 inches during operating conditions of the combustor assembly 100. More specifically, for the embodiment depicted, the radial gap 190 defined by the axial interface surface 186 of outer liner 112 with the inner surface 120 of the outer dome section 118 is between about 0.005 inches and about 0.015 inches, and the axial gap 192 defined by the radial interface surface 188 of the outer liner 112 with the forward surface 121 of the outer dome section 118 is between about 0.050 inches and about 0.100 inches. It should be appreciated, that as used herein, terms of approximation, such as "about" and "approximately," refer to being within a ten percent (10%) margin of error.

The combustor assembly 100 may be designed such the radial and axial gaps 190, 192 defined by the axial interface surface 186 with the inner surface 120 and by the radial interface surface 188 with the forward surface 121 allow for only a predetermined amount of airflow therethrough into the combustion chamber 114. Notably, allowing such a flow of air during operating conditions of the combustor assembly 100 may ensure relatively hot combustion gases within the combustion chamber 114 do not flow into and/or through the slot 122 of the outer dome section 118, potentially damaging certain components of the combustor assembly 100.

Figure 4:
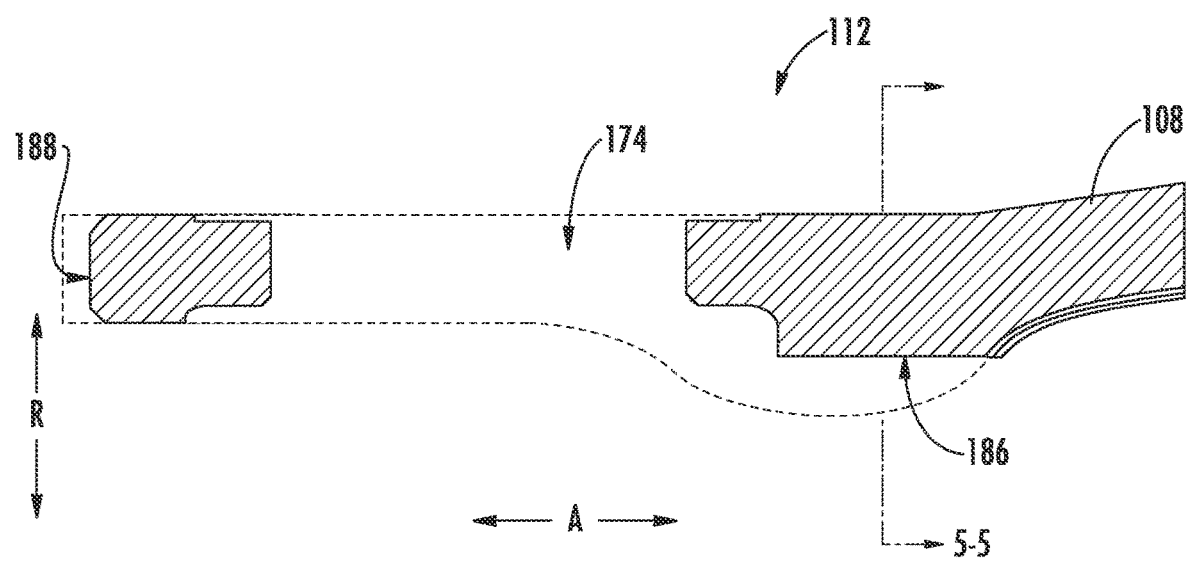
FIG. 4 is a close-up, isolated view of the forward end of the exemplary outer liner of FIG. 3.

Referring now to FIG. 4, a close-up, isolated view of the forward end 112 of the outer liner 108 of FIGS. 2 and 3 is provided. More specifically, FIG. 4 shows the forward end 112 of the outer liner 108 including a baseline geometry. The outer liner 108 may be formed, e.g., of a CMC material, such that the outer liner 108 includes the baseline geometry. Subsequently, the outer liner 108 may be machined to define the axial interface surface 186 and the radial interface surface 188. The baseline geometry is depicted in phantom lines in FIG. 4. Accordingly, for the embodiment depicted, the axial interface surface 186 is a machined surface and a radial interface surface 188 is also a machined surface. By forming the forward end 112 of the outer liner 108 to include a baseline geometry and subsequently machining down the baseline geometry such that the axial interface surface 186 and the radial interface surface 188 are defined, the forward end 112 of the outer liner 108 may define the desired radial and axial gaps 190, 192 with the inner surface 120 and forward surface 121, respectively, of the outer dome section 118 during operating conditions of the combustor assembly 100 once the forward end 112 of the outer liner 108 is received within the slot 122 of the outer dome section 118.

Figure 5:
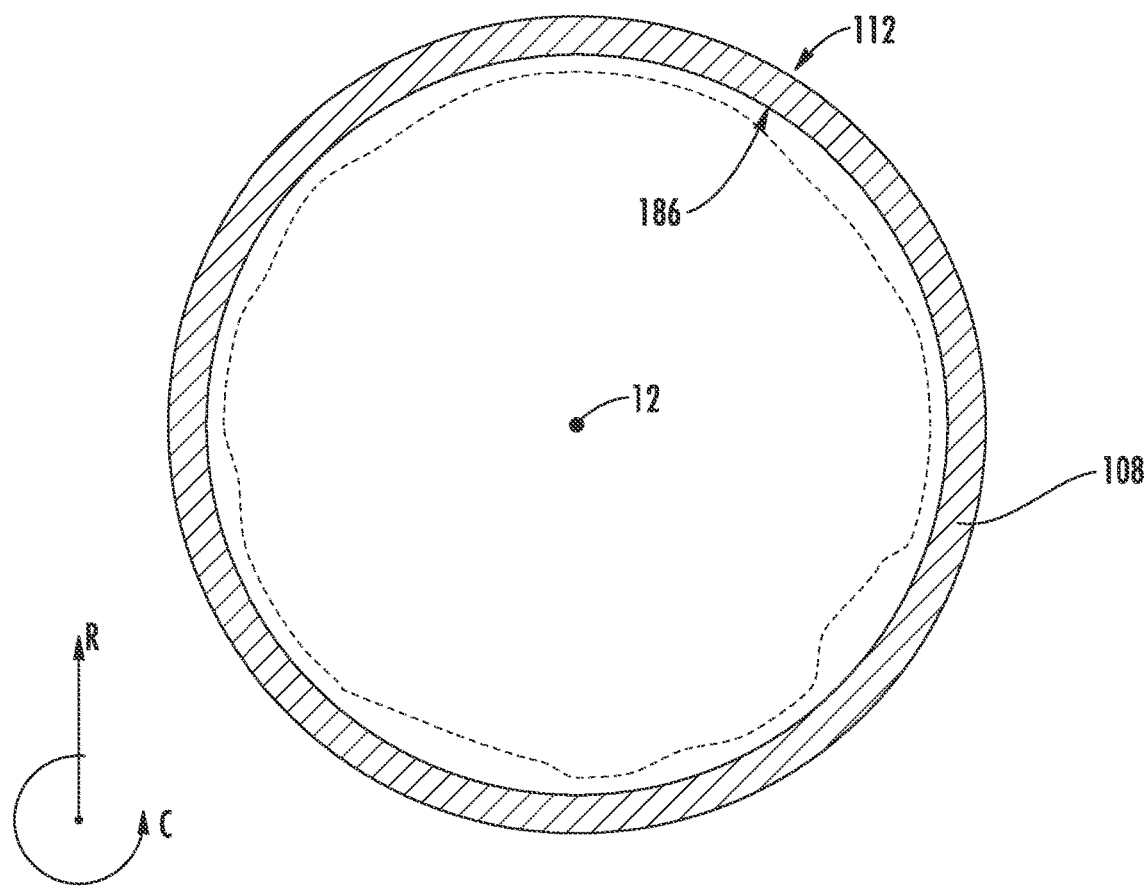
FIG. 5 is a schematic, axial view of the forward end of the exemplary outer liner of FIG. 3.

Furthermore, referring now to FIG. 5, an axial view of the forward end 112 of the outer liner 108 of FIGS. 2 and 3 is provided. More specifically, FIG. 5 also shows the forward end 112 of the outer liner 108 including the baseline geometry (shown in phantom). As is depicted, certain manufacturing methods of CMC components may make it difficult to form the forward end 112 of the outer liner 108 to include a precisely circular inner surface relative to a centerline 12 of the gas turbine engine. Accordingly, by forming the forward end 112 of the outer liner 108 to include the baseline geometry (depicted in phantom), and subsequently machining down the baseline geometry of the forward end 112, such that the axial interface surface 186 and radial interface surface 188 (see FIG. 4) are defined may ensure more consistent radial and axial gaps 190, 192 are defined with the inner surface 120 and the forward surface 121, respectively, of the outer dome section 118 along the circumferential direction C. More specifically, machining down the baseline geometry of the forward end 112 of the outer liner 108 may ensure the axial interface surface 186 defines a more precise circular shape with respect to the centerline 12 of the gas turbine engine, and therefore a more consistent radial gap 190 with the inner surface 120 of the outer dome section 118.

Moreover, referring back to FIG. 2, it should be appreciated that the forward end 106 of the inner liner 102 may be formed in substantially the same manner as the forward end 112 of the outer liner 108, and also that the forward end 106 of the inner liner 102 may be attached to the inner dome section 116 in substantially the same manner that the forward end 112 of the outer liner 108 is attached to the outer dome section 118. For example, the mounting assemblies 144 attaching the forward end 106 of the inner liner 102 to the inner dome section 116 may be configured in substantially the same manner as the mounting assemblies 144 attaching the forward end 112 of the outer liner 108 to the outer dome section 118. Additionally, the inner dome section 116 may define a forward surface 121 and an inner surface 120 (i.e., inner relative to the combustion chamber 114). Additionally, the forward end 106 of the inner liner 102 may include an axial interface surface 186 facing the inner surface 120 of the inner dome section 116 and a radial interface surface 188 facing the forward surface 121 of the inner dome section 116. The axial interface surface 186 of the forward end 106 of the inner liner 102 may define a radial gap with the inner surface 120 of the inner dome section 116 less than about 0.020 inches during operating conditions the combustor assembly 100, and further the radial interface surface 188 of the forward end 106 of the inner liner 102 may define an axial gap with the forward surface 121 of the inner dome section 116 less than about 0.150 inches during operating conditions of the combustor assembly 100.

Further, still, it should be appreciated that in other exemplary embodiments, other portions of the liners, and/or other components of a gas turbine engine may be formed in a similar manner to ensure such portions of the liners (or other component of a gas turbine engine) define a desired thickness and/or clearance with adjacent components. For example, referring now to FIG. 6, a side, cross-sectional view is provided of a liner in accordance with an exemplary embodiment of the present disclosure. In certain exemplary embodiments the liner may be an outer liner 108 configured in substantially the same manner as the outer liner 108 described above with reference to FIGS. 2 through 5. Accordingly, the same numbers may refer to same or similar part.

Figure 6:
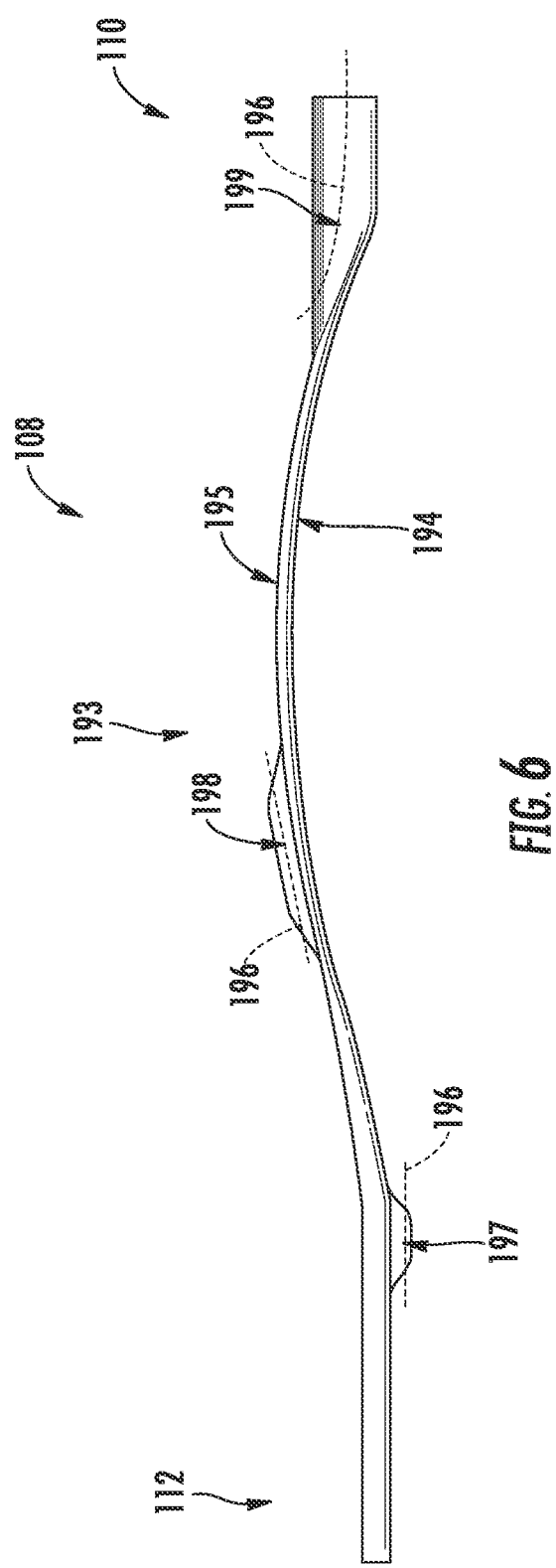
FIG. 6 side, cross-sectional view of an outer liner in accordance with an exemplary embodiment of the present disclosure.

For example, as is depicted, the outer liner 108 of FIG. 6 extends generally between an aft end 110 and a forward end 112. The outer liner 108 additionally defines a midspan region 193 positioned between the forward end 112 and the aft end 110. Moreover, the outer liner 108 generally defines an inner surface 194, defining at least in part a combustion chamber when installed (see FIG. 2), and an opposite, outer surface 195. As with the outer liner 108 described above with reference to FIGS. 4 and 5, the outer liner 108 of FIG. 6 is formed, e.g., of a CMC material, such that the outer liner 108 includes a baseline geometry. Subsequent to formation, the outer liner 108 may be machined in various locations to define certain interface surfaces as may be desired for the specific application. More particularly, as is depicted via the various machine lines 196 in phantom, the forward end 112 of the outer liner 108 is machined to define an axial interface surface 197, the midspan region 193 of the outer liner 108 is machined to define a midspan interface surface 198 at the outer surface 195, and the aft end 110 of the outer liner 108 is machined to define an aft end interface surface 199. Notably, the exemplary outer liner 108 of FIG. 6 is formed such that the remaining portion of the outer liner 108 (i.e., after machining) includes a sufficient mass or thickness to maintain any desired mechanical properties (e.g., stiffness, strength, flexibility, etc.).

It should be appreciated, however, that in still other exemplary embodiments, any other suitable portions of the baseline geometry of the outer liner 108 of FIG. 6 may be machined to define a desired interface surface. Moreover, in still other embodiments, any other suitable component of a gas turbine engine, and specifically any other suitable component formed of a CMC material, may be configured in a similar manner as exemplary outer liner 108 of FIG. 6 to include a baseline geometry that may be machined down to define a desired interface surface.

Figure 7:
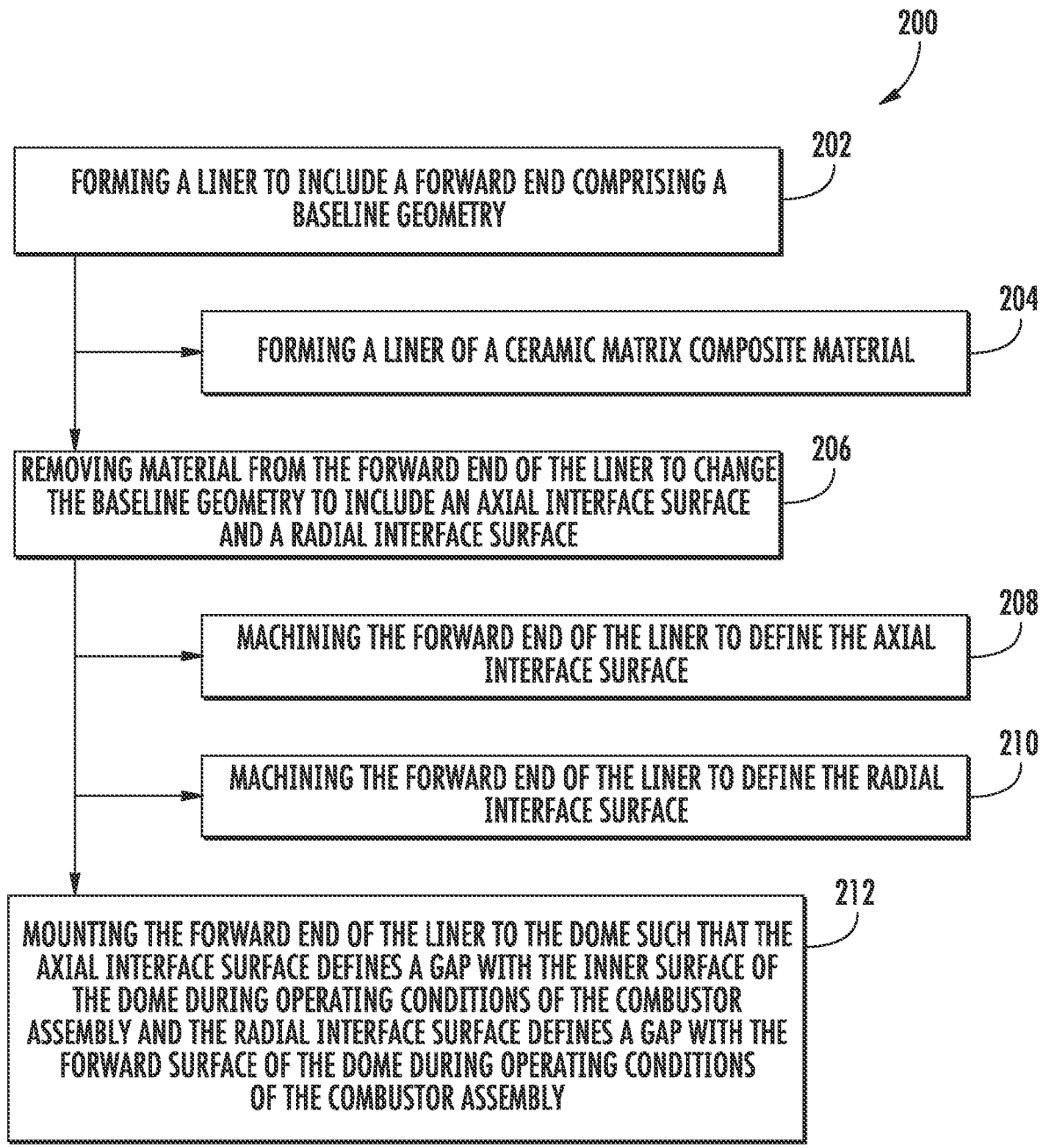
FIG. 7 is a flow diagram of a method for manufacturing a combustor assembly of a gas turbine engine in accordance with an exemplary aspect of the present disclosure.

Referring now to FIG. 7, a method (200) for manufacturing a combustor assembly of a gas turbine engine in accordance with an exemplary aspect of the present disclosure is provided. The exemplary method (200) depicted in FIG. 7 may be used to manufacture the exemplary combustor assembly described above with reference to FIGS. 2 through 5. Accordingly, the exemplary combustor assembly manufactured according to the exemplary method (200) may include a liner and a dome, with the dome including a forward surface and an inner surface, the forward surface and the inner surface together at least partially defining a slot.

The exemplary method (200) includes at (202) forming a liner to include a forward end having a baseline geometry. In certain embodiments, the liner may be an inner liner of the combustor assembly, or alternatively, may be an outer liner of the combustor assembly. Notably, for the embodiment depicted, forming the liner at (202) includes at (204) forming the liner of a ceramic matrix composite material.

Further, the exemplary method (200) includes at (206) removing material from the forward end of the liner to change the baseline geometry to include an axial interface surface and a radial interface surface. In certain exemplary embodiments, removing material from the forward end of the liner at (206) includes at (208) machining the forward end of the liner to define the axial interface surface, and at (210) machining the forward end of the liner to define the radial interface surface.

Moreover, referring still to FIG. 7, the exemplary method (200) additionally includes at (212) mounting the forward end of the liner at least partially within the slot of the dome, such that the axial interface surface defines a radial gap with the inner surface of the dome and the radial interface surface defines an axial gap with the forward surface the dome. For the exemplary aspect depicted, at least one of the axial gap or the radial gap is less than about 0.150 inches during operating conditions of the combustor assembly, or more particularly, less than about 0.020 inches during operating conditions of the combustor assembly. Specifically, in at least certain exemplary aspects, the radial gap may be less than about 0.020 inches during operating conditions of the combustor assembly and the axial gap may be less than about 0.150 inches during operating conditions of the combustor assembly.

A combustor assembly manufactured in accordance with one or more exemplary aspects of the present disclosure may ensure that a desired amount of airflow is provided through the gaps defined between the forward end of the liner and the dome during operating conditions of the combustor assembly, such that relatively hot combustion gases do not flow through the slot of the combustor dome, potentially damaging certain components of the combustor assembly.

Figure 8:
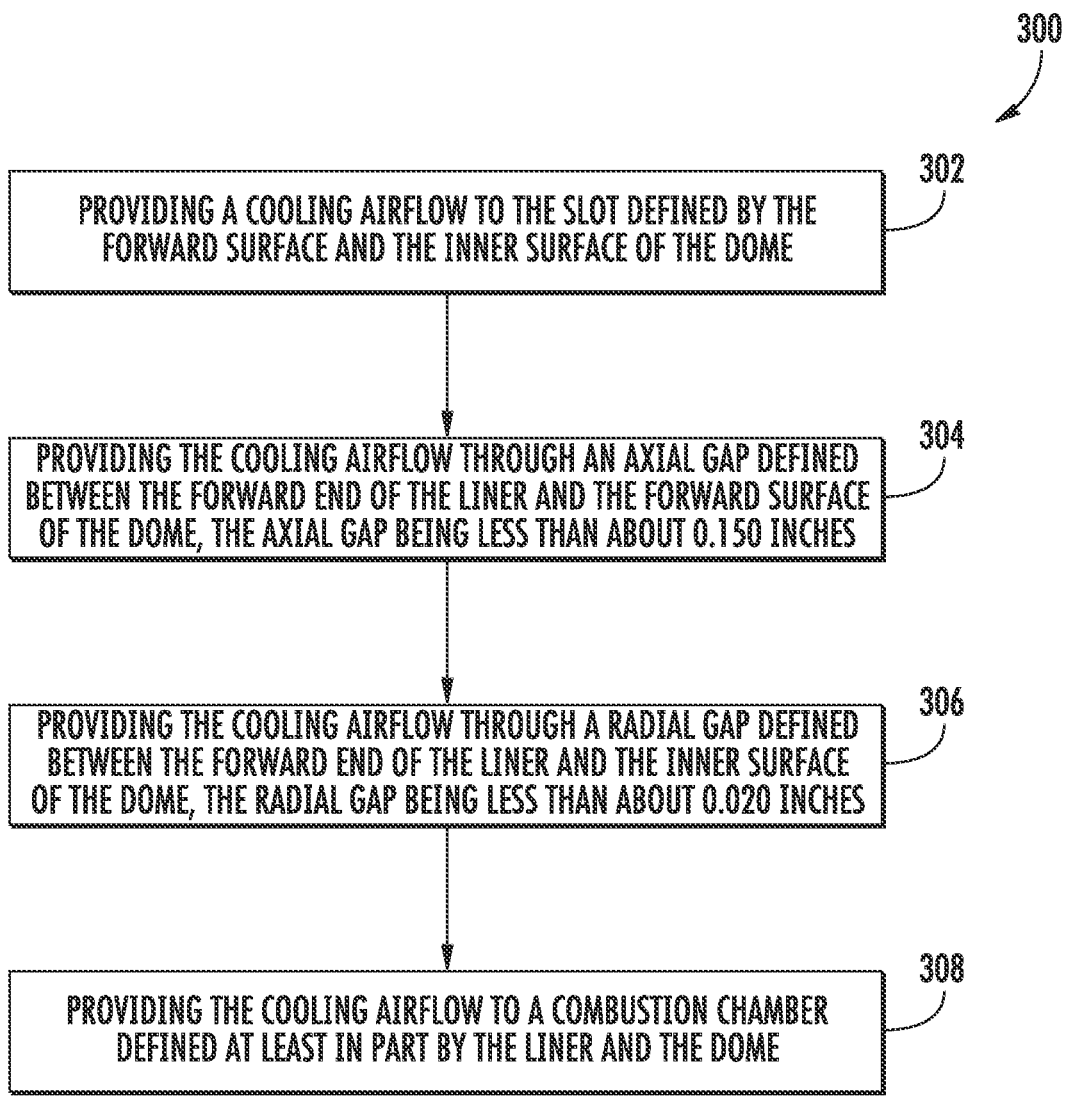
FIG. 8 is a flow diagram of a method for cooling a component of a combustor assembly of a gas turbine engine in accordance with an exemplary aspect of the present disclosure.

Furthermore, referring now to FIG. 8, a method (300) for cooling a combustor assembly of a gas turbine engine in accordance with an exemplary aspect of the present disclosure is provided. The exemplary method (300) depicted in FIG. 8 may be used to cool the exemplary combustor assembly described above with reference to FIGS. 2 through 5. Accordingly, the exemplary combustor assembly of the exemplary method (300) may include a liner and a dome, with the dome including a forward surface and an inner surface, the forward surface and the inner surface together at least partially defining a slot. Further, the liner may include a forward end received within the slot of the dome.

The exemplary method (300) includes at (302) providing a cooling airflow to the slot defined by the forward surface and the inner surface of the dome. The cooling airflow may be a portion of an airflow through a compressor section of the gas turbine engine. For example, providing the cooling airflow to the slot at (302) may include providing a portion of an airflow through the compressor section over a forward surface of the dome to the slot.

Additionally, the exemplary method (300) includes at (304) providing the cooling airflow through an axial gap defined between the forward end of the liner and the forward surface of the dome, the axial gap being less than about 0.150 inches. The exemplary method (300) additionally includes at (306) providing the cooling airflow through a radial gap defined between the forward end of the liner and the inner surface of the dome, the radial gap being less than about 0.020 inches. More specifically, the axial gap may be defined between a radial interface surface of the forward end of the liner and the forward surface of the dome, and further, the radial gap may be defined between an axial interface surface of the forward end of the liner and the inner surface of the dome.

Moreover, as is also depicted, the exemplary method (300) includes at (308) providing the cooling airflow to a combustion chamber defined at least in part by the liner and the dome. Cooling a combustor assembly in accordance with the exemplary method (300) may ensure a sufficient amount of cooling airflow is provided through the slot, around the forward end of the liner, and to the combustion chamber to prevent combustion gases from flowing back through the slot. Moreover, by providing the cooling airflow through the radial and axial gaps, excessive cooling airflow may be prevented from flowing therethrough.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine defining a centerline, an axial direction, and a radial direction, the combustor assembly comprising:
 a dome defining a slot between a first inner surface of the dome, a second inner surface of the dome, and a forward surface of the dome;
 a liner formed of a ceramic matrix composite (CMC) material and at least partially defining a combustion chamber, the liner extending between an aft end and a forward end thereof, the forward end of the liner configured to be received within the slot of the dome and comprising a liner opening, a radial interface surface, and an axial interface surface, the radial interface surface of the liner and the forward surface of the dome defining an axial gap therebetween, the axial interface surface of the liner and the first inner surface of the dome defining a first radial gap therebetween, and an outer surface of the liner and the second inner surface of the dome defining a second radial gap therebetween;

at least one mounting assembly configured to secure the liner to the dome, the at least one mounting assembly comprising:

a grommet arranged in the liner opening, the grommet including a grommet body extending axially through the liner opening between an inner surface of the liner and the outer surface of the liner, an inner collar extending radially outward from the grommet body and arranged in an inner groove defined along the inner surface of the liner, and an outer collar extending radially outward from the grommet body, axially opposite the inner collar, and arranged in an outer groove defined along the outer surface of the liner;

a bushing arranged in the liner opening and within the grommet, the grommet being arranged to reduce wear on the forward end of the liner by slidably engaging the bushing as the liner moves relative to the dome;

a pin received by the bushing and extending through the dome and the liner opening; and a nut disposed adjacent the dome and configured to engage the pin;

wherein the grommet body, the inner collar, and the outer collar each contacts the liner.

2. The combustor assembly of claim 1, wherein the radial interface surface is a machined surface to define the axial gap.

3. The combustor assembly of claim 1, wherein the axial interface surface is a machined surface to define the first radial gap.

4. The combustor assembly of claim 1, wherein the axial gap and the first radial gap are configured to allow a predetermined amount of airflow therethrough into the combustion chamber.

5. The combustor assembly of claim 1, the dome further comprising a yoke and a base plate, wherein the second inner surface of the dome is an inner surface of the yoke, and wherein the outer collar is positioned between the outer surface of the liner and the inner surface of the yoke, and the inner collar is positioned between the inner surface of the liner and the base plate.

6. The combustor assembly of claim 1, wherein the dome is formed of a metal material.

7. The combustor assembly of claim 1, wherein the outer surface of the liner defines a cold side surface and a mid-span region, and wherein the liner defines an outer interface surface on the cold side surface within the mid-span region.

8. The combustor assembly of claim 1, wherein the liner is an outer liner and wherein the dome is an outer dome section.

9. The combustor assembly of claim 1, wherein the liner is an inner liner and wherein the dome is an inner dome section.

10. The combustor assembly of claim 1, the dome further comprising a yoke and a base plate, wherein the pin extends through the yoke, the forward end of the liner, and the base plate.

11. The combustor assembly of claim 1, wherein the axial interface surface is defined at a local area of the liner having an increased thickness relative to a first area immediately forward of the axial interface surface and a second area immediately aft of the axial interface surface.

12. The combustor assembly of claim 1, wherein the axial interface surface and the first inner surface of the dome extend in a direction parallel to the axial direction.

13. The combustor assembly of claim 1, wherein the radial interface surface and the forward surface of the dome extend in a direction parallel to the radial direction.

14. The combustor assembly of claim 1, the dome comprising a yoke and a base plate, the yoke and the base plate defining the slot therebetween.

15. The combustor assembly of claim 14, wherein the nut is configured to press the bushing between the yoke and the base plate.

16. The combustor assembly of claim 1, wherein at least one of the axial gap or the first radial gap is less than about 0.150 inches during operating conditions of the combustor assembly.

17. The combustor assembly of claim 16, wherein the first radial gap is less than about 0.020 inches during the operating conditions of the combustor assembly.

18. The combustor assembly of claim 17, wherein the first radial gap is between 0.005 and 0.015 inches during the operating conditions of the combustor assembly.

19. The combustor assembly of claim 18, wherein the axial gap is less than about 0.150 inches during the operating conditions of the combustor assembly.

* * * * *